US011501408B2

(12) United States Patent
Kaino

(10) Patent No.: US 11,501,408 B2
(45) Date of Patent: Nov. 15, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Akihiko Kaino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/258,905

(22) PCT Filed: Jul. 11, 2019

(86) PCT No.: PCT/JP2019/027473
§ 371 (c)(1),
(2) Date: Jan. 8, 2021

(87) PCT Pub. No.: WO2020/044809
PCT Pub. Date: Mar. 5, 2020

(65) Prior Publication Data
US 2021/0287334 A1  Sep. 16, 2021

(30) Foreign Application Priority Data
Aug. 31, 2018 (JP) .............................. JP2018-162265

(51) Int. Cl.
*G06K 9/00* (2022.01)
*G06T 3/40* (2006.01)
*G06T 7/586* (2017.01)

(52) U.S. Cl.
CPC ............ *G06T 3/4007* (2013.01); *G06T 7/586* (2017.01); *G06T 2207/20021* (2013.01); *G06T 2207/20224* (2013.01)

(58) Field of Classification Search
CPC ................... G06T 3/4007; G06T 7/586; G06T 2207/20021; G06T 2207/20224;
(Continued)

(56) References Cited

U.S. PATENT DOCUMENTS 6,980,254 B1 * 12/2005 Nishihashi .............. G06T 3/403
348/452
2004/0022418 A1 * 2/2004 Oota ....................... G06T 7/593
382/106
2005/0144540 A1 * 6/2005 Fujishiro ............... G06T 3/4007
714/48

FOREIGN PATENT DOCUMENTS

JP       2012-122975 A    6/2012
WO    WO 2015/098288 A1  7/2015

* cited by examiner

Primary Examiner — Dhaval V Patel
(74) Attorney, Agent, or Firm — Paratus Law Group, PLLC

(57) ABSTRACT

There is provided an information processing apparatus, an information processing method, and a program with which highly accurate depth information can be acquired. The information processing apparatus includes an interpolation image generation unit, a difference image generation unit, and a depth calculation unit. The interpolation image generation unit generates an interpolation image on the basis of a first normal image and a second normal image among the first normal image, a pattern image irradiated with infrared pattern light, and the second normal image, the interpolation image corresponding to a time at which the pattern image is captured. The difference image generation unit generates a difference image between the interpolation image and the pattern image. The depth calculation unit calculates depth information by using the difference image.

14 Claims, 8 Drawing Sheets

(58) Field of Classification Search
CPC ........... G06T 2207/30244; G06T 7/521; G06T 7/593; G01B 11/2513
See application file for complete search history.

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/027473 (filed on Jul. 11, 2019) under 35 U.S.C. § 371, which claims priority to Japanese Patent Application No. 2018-162265 (filed on Aug. 31, 2018), which are all hereby incorporated by reference in their entirety.

TECHNICAL FIELD

The present technology relates to an information processing apparatus, an information processing method, and a program.

BACKGROUND ART

Patent Literature 1 discloses that a target object is irradiated with infrared rays to acquire depth information of the target object, and a three-dimensional image of the target object is generated. Specifically, the surface of the target object is irradiated with a pattern of infrared rays by utilizing a feature of the infrared rays that are invisible to human eyes, an image of the target object is captured by an infrared camera, and the shape of the object is acquired on the basis of the captured image.

CITATION LIST

Patent Literature

Patent Literature 1: WO-A-2015/098288

DISCLOSURE OF INVENTION

Technical Problem

In order to generate a more accurate three-dimensional image of a target object, it is desirable to make the depth information of the target object more accurate.

In view of the above circumstances, it is an object of the present technology to provide an information processing apparatus, an information processing method, and a program that are capable of acquiring depth information with high accuracy.

Solution to Problem

In order to achieve the object described above, an information processing apparatus according to an embodiment of the present technology includes an interpolation image generation unit, a difference image generation unit, and a depth calculation unit.

The interpolation image generation unit generates an interpolation image on the basis of a first normal image and a second normal image among the first normal image, a pattern image irradiated with infrared pattern light, and the second normal image, the interpolation image corresponding to a time at which the pattern image is captured.

The difference image generation unit generates a difference image between the interpolation image and the pattern image.

The depth calculation unit calculates depth information by using the difference image.

According to such a configuration, the depth information is obtained by using the difference image between the interpolation image and the pattern image that are considered to be captured at the same timing, and thus it is possible to obtain the depth information with high accuracy.

The depth calculation unit may calculate the depth information from the pattern image on the basis of a result of determining reliability of the depth information in the pattern image, the depth information being determined by using the difference image.

According to such a configuration, it is possible to calculate the depth information by using the pattern image determined to have high reliability of the depth information, and to obtain the depth information with high accuracy.

The information processing apparatus may further include a reliability determination unit that determines the reliability of the depth information in the pattern image by using luminance information for each of divided regions obtained by dividing the difference image into grids.

The luminance information may be a dispersion value of luminance for each of the divided regions.

The luminance information may be a dynamic range of luminance for each of the divided regions.

The luminance information may be a spatial frequency for each of the divided regions.

Thus, using the dispersion value of luminance, the dynamic range, or the spatial frequency makes it possible to determine the clearness of the image for each divided region of the difference image and to determine the reliability of the depth information.

An irradiation region of the infrared pattern light in a pattern image at imaging for a next pattern image may be set in accordance with a result of the determination by the reliability determination unit.

The infrared pattern light may be emitted from a pattern irradiation unit including a plurality of infrared light sources, and the pattern image may be captured when the infrared pattern light having irradiation regions different for each of the plurality of infrared light sources is emitted.

The infrared pattern light having irradiation regions different for each of the plurality of infrared light sources is emitted and the pattern image is captured in such a manner, and thus the presence or absence of irradiation can be controlled for each irradiation region. This makes it possible to turn off the irradiation of the infrared pattern light corresponding to the region where the reliability is determined to be high in the reliability determination, for example, and to reduce the power consumption.

The first normal image, the pattern image, and the second normal image may be captured by a camera including an imaging element, and the information processing apparatus may further include an exposure control unit that controls an exposure time of the imaging element by using the luminance information for each of the divided regions obtained by dividing the difference image into grids.

According to such a configuration, it is possible to control the exposure time of the imaging element in the next imaging on the basis of the luminance information for each divided region, and to obtain a pattern image with high reliability of the depth information in the next imaging.

The information processing apparatus may further include an irradiation control unit that controls irradiation power of the infrared pattern light by using the luminance information for each of the divided regions obtained by dividing the difference image into grids.

According to such a configuration, it is possible to control the irradiation power of the infrared pattern light in the next imaging on the basis of the luminance information for each divided region, and to obtain a pattern image with high reliability of the depth information in the next imaging.

The interpolation image generation unit may generate the interpolation image on the basis of the first normal image captured immediately before the pattern image is captured, and the second normal image captured immediately after the pattern image is captured.

According to such a configuration, it is possible to generate an interpolation image with high accuracy.

At least one of the first normal image or the second normal image may be acquired within a same frame period as the pattern image.

In order to achieve the object described above, an information processing method according to an embodiment of the present technology includes: acquiring a first normal image, a pattern image irradiated with infrared pattern light, and a second normal image; generating an interpolation image on the basis of the first normal image and the second normal image, the interpolation image corresponding to a time at which the pattern image is captured; generating a difference image between the interpolation image and the pattern image; and calculating depth information by using the difference image.

In order to achieve the object described above, a program according to an embodiment of the present technology causes an information processing apparatus to execute processing including the steps of: acquiring a first normal image, a pattern image irradiated with infrared pattern light, and a second normal image; generating an interpolation image on the basis of the first normal image and the second normal image, the interpolation image corresponding to a time at which the pattern image is captured; generating a difference image between the interpolation image and the pattern image; and calculating depth information by using the difference image.

Advantageous Effects of Invention

As described above, according to the present technology, it is possible to acquire the depth information with high accuracy. Note that the effects described herein are not necessarily limited, and may be any of the effects described in the present disclosure.

MODE(S) FOR CARRYING OUT THE INVENTION

[Outline]

Figure 1:
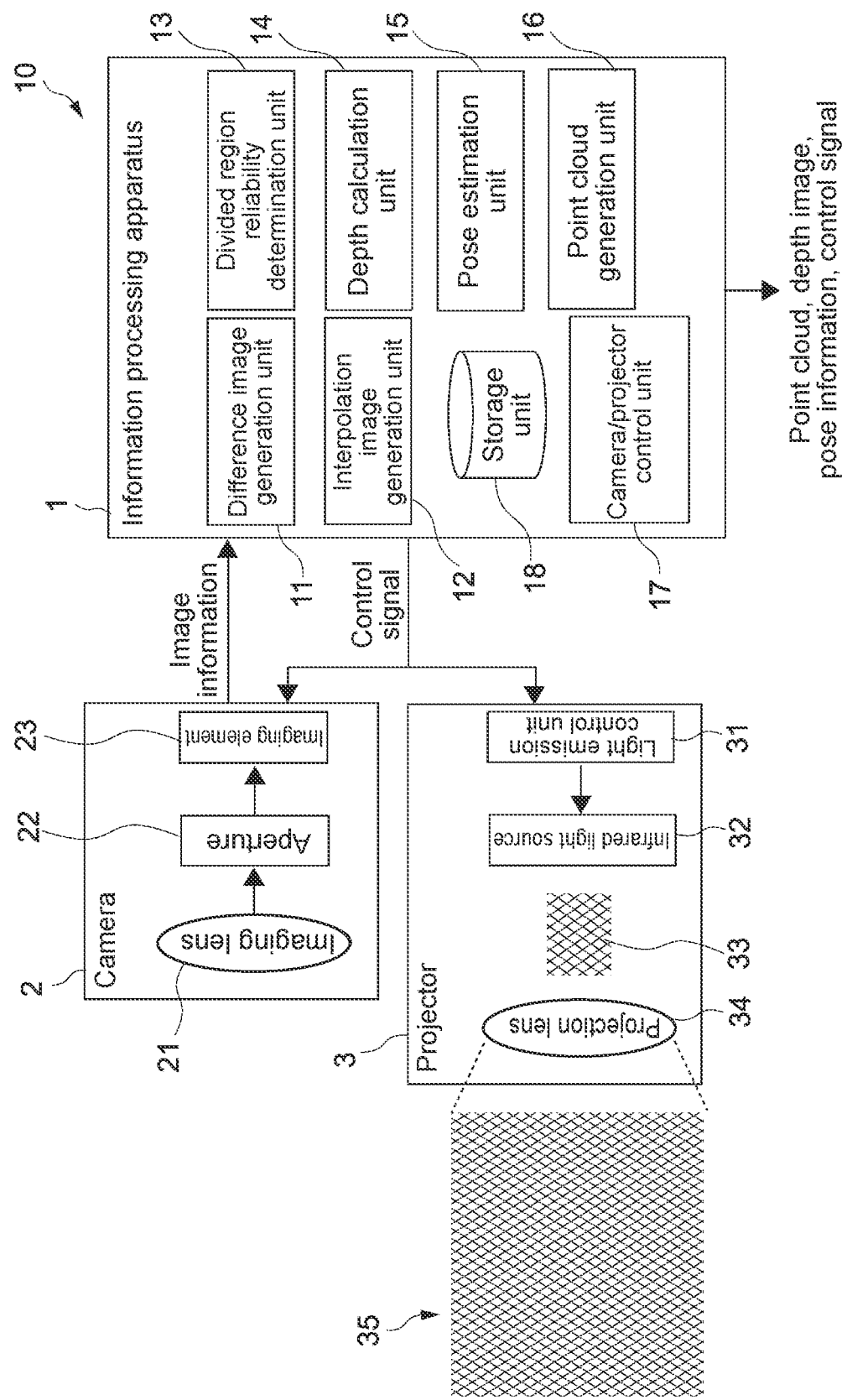
FIG. 1 is a diagram for describing the outline of an information processing system according to a first embodiment of the present technology and is a block diagram showing an example of a configuration of the information processing apparatus.

An information processing system 10 including an information processing apparatus 1 according to an embodiment of the present technology will be described with reference to FIG. 1. FIG. 1 is a diagram for describing the outline of the information processing system 10 and is a block diagram showing an example of a configuration of the information processing apparatus.

As shown in FIG. 1, the information processing system 10 includes the information processing apparatus 1, a camera 2, and a projector 3.

In the information processing system 10, the information processing apparatus 1 acquires image information captured by the camera 2. Specifically, the information processing apparatus 1 acquires a first normal image of a target object, which is an imaging target object sequentially imaged by the camera 2, a pattern image irradiated with infrared random pattern light, and a second normal image.

The pattern image is an image obtained by imaging the target object irradiated with infrared random pattern light as pattern light emitted from the projector 3 serving as a pattern irradiation unit.

The information processing apparatus 1 estimates and generates an interpolation image corresponding to the time at which the pattern image is acquired, from the acquired first normal image and the acquired second normal image. The information processing apparatus 1 analyzes a difference image between the interpolation image and the pattern image.

The pattern image includes depth information, and the reliability of the depth information of the pattern image is determined by an analysis of the difference image by the information processing apparatus 1. Then, the depth information of the pattern image is calculated on the basis of a determination result of the reliability of the depth information.

As described above, in this embodiment, the reliability of the depth information of the pattern image is determined by analyzing the difference image. Using the pattern image determined to be highly reliable by such a reliability determination, the depth information is calculated, and thus highly accurate depth information can be obtained.

On the basis of such highly accurate depth information, it is possible to generate a depth image that indicates the distance to the target object for each pixel.

The depth information represents the distance between the camera 2 and a subject (target object) and may include depth information of a feature point.

Further, in this embodiment, the information processing apparatus 1 acquires pose information of the camera 2 on the basis of the calculated depth information and the interpolation image. Then, the information processing apparatus 1 can generate a point cloud as three-dimensional space information of the target object serving as a subject on the basis of the calculated depth information and the pose information. The point cloud is generated using the depth information with high accuracy, and thus has high accuracy.

Furthermore, by the analysis of the difference image by the information processing apparatus 1, the control signals for the camera 2 and the projector 3 are generated such that a pattern image having highly reliable depth information can be obtained, and the exposure time in the camera 2 and the irradiation power of the infrared random pattern light from the projector 3 are controlled.

The present technology can be applied to the technology in which acquisition of depth information is important.

For example, the present technology can be applied to a self-position estimation in the augmented reality (AR), virtual reality (VR), and mixed reality (MR) applications using a head-mounted display or a glasses-type wearable device. Further, the present technology can be applied to a self-position estimation in the AR, VR, and MR applications using a portable terminal such as a smartphone or a tablet. In addition, the present technology can be applied to a self-position estimation in an autonomous mobile body such as an autonomous vehicle, an unmanned airplane, or an autonomous mobile robot. In addition, the present technology can also be applied to the capture of images.

Further, the generated point cloud can be used to generate a three-dimensional model that reflects the structure of a surrounding environment. This three-dimensional model can be used for the interaction representation in AR, VR, and MR and for the route control of the mobile body. It is also possible to generate a three-dimensional view or a two-dimensional plan view of a building from the three-dimensional model.

Hereinafter, the information processing apparatus 1 will be described in detail.

[Configuration Example of Camera]

The configuration of the camera 2 will be described with reference to FIG. 2 in addition to FIG. 1. FIG. 2(A) is a diagram in which a part of the pulse waveform output from a camera/projector control unit 17 of the information processing apparatus 1, which will be described later, in this embodiment is cut out.

The camera 2 is a stereo camera and includes two cameras, a right camera and a left camera. The right camera and the left camera have the same configuration. The two cameras are arranged with an interval with which parallax is sufficiently generated. The two cameras release the shutters for imaging at a rising edge of a camera control pulse 201 (see FIG. 2(A)) serving as a control signal generated by the camera/projector control unit 17.

As shown in FIG. 1, the camera 2 includes an imaging lens 21, an aperture 22, and an imaging element 23.

The imaging lens 21 collects light from the target object and guides the light to the imaging element 23.

The aperture 22 adjusts the amount of light passing therethrough.

The imaging element 23 converts light into an electric signal to generate image data. Further, in the imaging element 23, the exposure time is changed by controlling a transistor in a pixel of the imaging element 23 in accordance with the control signal from the camera/projector control unit 17. In this manner, the method of changing the exposure time by controlling the transistor in the pixel is called an electronic shutter method.

Note that an example in which the camera 2 employs the electronic shutter method and the exposure time is changed by controlling the transistor will be described in this embodiment, but the camera 2 may further include a mechanical shutter, and the exposure time may be changed by controlling the mechanical shutter.

In this embodiment, as shown in FIG. 2(A), the camera 2 is controlled such that the shutter is continuously released (imaging is performed) three times in one frame period. Of those, a first normal image and a second normal image are acquired at the first and third shutters, respectively, and a pattern image is acquired at the second shutter. As a result, the first normal image, the pattern image, and the second normal image are temporally continuously acquired in sequence.

The normal image is an image obtained by imaging the target object that is not irradiated with infrared random pattern light. The pattern image is an image obtained by imaging the target object irradiated with the infrared random pattern light. The normal image and the pattern image may be monochrome or colored.

Figure 2:
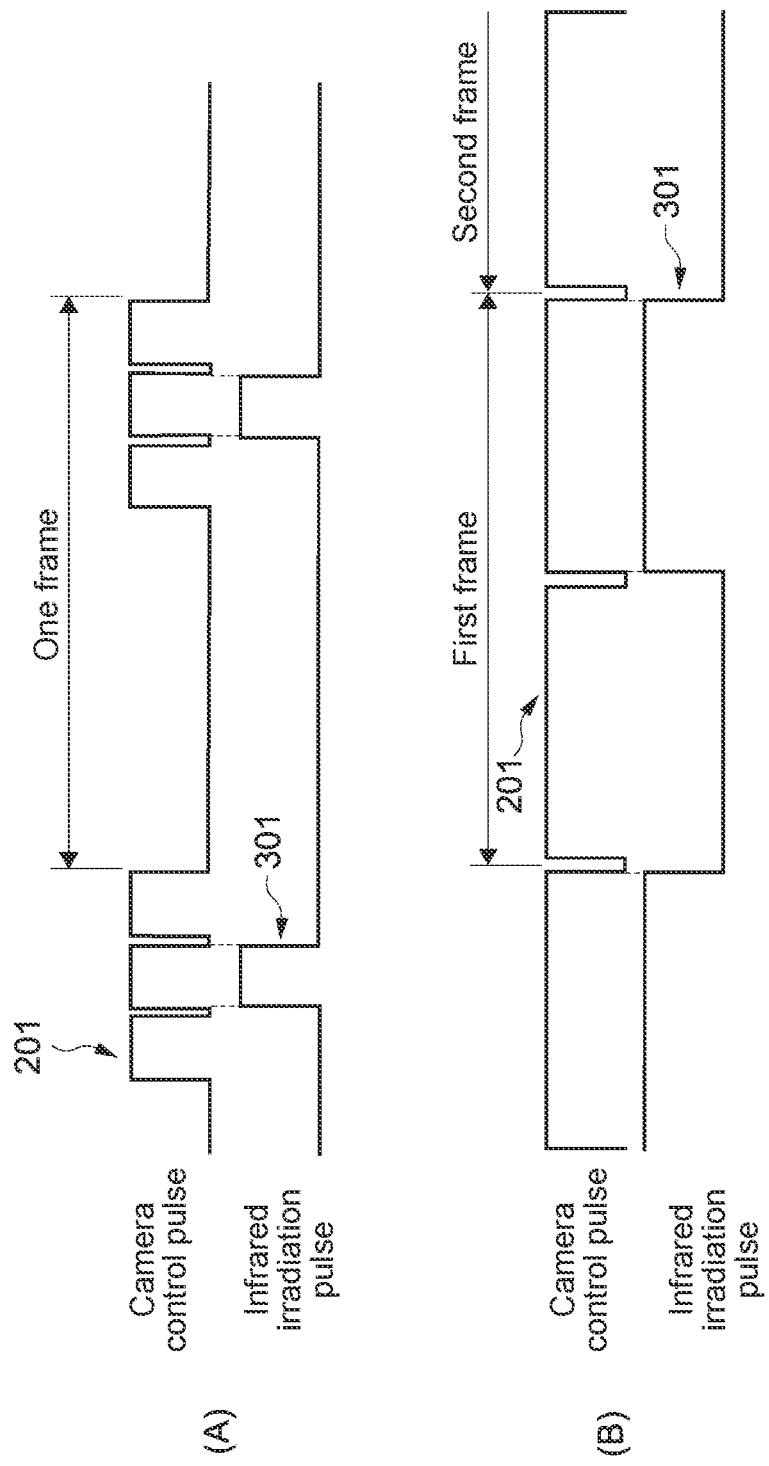
FIG. 2 is a diagram obtained by cutting out part of a camera control pulse waveform and an infrared irradiation pulse waveform as control signals output from a camera/projector control unit of the information processing apparatus described above.

In FIG. 2, the pulse width of the camera control pulse corresponds to the exposure time.

[Configuration Example of Projector]

A configuration of the projector 3 will be described with reference to FIGS. 1 and 2. The projector 3 is an example of a pattern irradiation unit for irradiating the surface of the target object with infrared random pattern light 35.

As shown in FIG. 1, the projector 3 includes a light emission control unit 31, an infrared light source 32, a random pattern mask 33, and a projection lens 34.

The light emission control unit 31 controls the light emission by passing a current through the infrared light source 32 for a constant time, in accordance with the rise of an infrared irradiation control pulse 301 (see FIG. 2(A)) as a control signal input from the camera/projector control unit 17.

The infrared light source 32 is an infrared light emitting unit and is achieved by, for example, an infrared light emitting diode (LED). The infrared light source 32 emits an infrared wavelength (for example, a wavelength of approximately 850 nm) while the light emission control unit 31 is passing a current therethrough.

The infrared light from the infrared light source 32 passes through the random pattern mask 33. Note that the random pattern mask 33 is illustrated in a grid pattern in FIG. 1, but the random pattern mask 33 has a random pattern in actuality.

In this embodiment, the number of infrared light sources 32 is one.

The random pattern mask 33 is achieved by, for example, a metallic mesh-like plate subjected to random and fine drilling by electroforming.

The projection lens 34 projects, to the object, the infrared random pattern light 35 as pattern light formed by infrared rays transmitted through the random pattern mask 33. In the example shown in FIG. 1, a single projection lens 34 is illustrated for simplification, but in actuality, the projection lens 34 can be configured by combining a plurality of convex lenses and concave lenses depending on the use applications such as a necessary angle of view, focal length, and the like.

The light emission control unit 31 flows a current while the infrared irradiation control pulse 301 is at a high level.

The magnitude of the current is controlled by a control signal input from the camera/projector control unit 17, and the irradiation power of the infrared rays emitted from the infrared light source 32 is controlled by the control signal. When the irradiation power of the infrared rays emitted from the infrared light source 32 is controlled, the irradiation power of the infrared random pattern light 35 emitted from the projector 3 is controlled.

In this embodiment, as shown in FIG. 2(A), the light emission control unit 31 is controlled on the basis of the control signal input from the camera/projector control unit 17 such that the object is irradiated with the infrared random pattern light 35 in accordance with the second shutter of the camera 2. The pulse width of the infrared irradiation control pulse 301 is the time for irradiating the symmetrical object with the infrared random pattern light 35 and is equivalent to the exposure time.

As shown in FIG. 2(A), in this embodiment, the shutter is continuously released three times during one frame. Of those, when the second shutter is released, the target object is irradiated with the infrared random pattern light 35. Thus, the first normal image is acquired by the first exposure (first shutter), the pattern image is acquired by the second exposure (second shutter), and the second normal image is acquired by the third exposure (third shutter) in this order.

[Configuration Example of Information Processing Apparatus]

(Outline)

Figure 3:
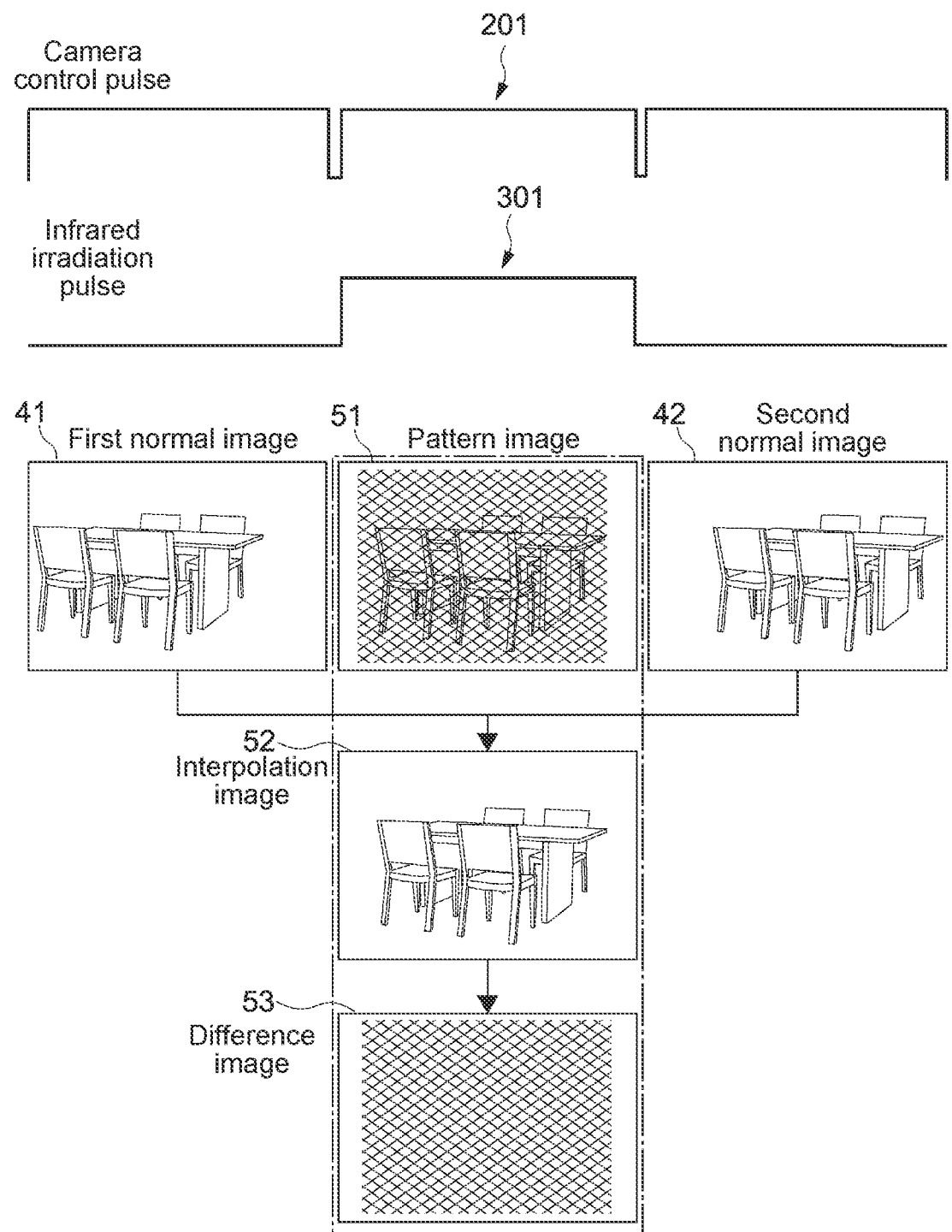
FIG. 3 is a diagram for describing a procedure of generating an interpolation image and a difference image by the information processing apparatus described above.
Figure 4:
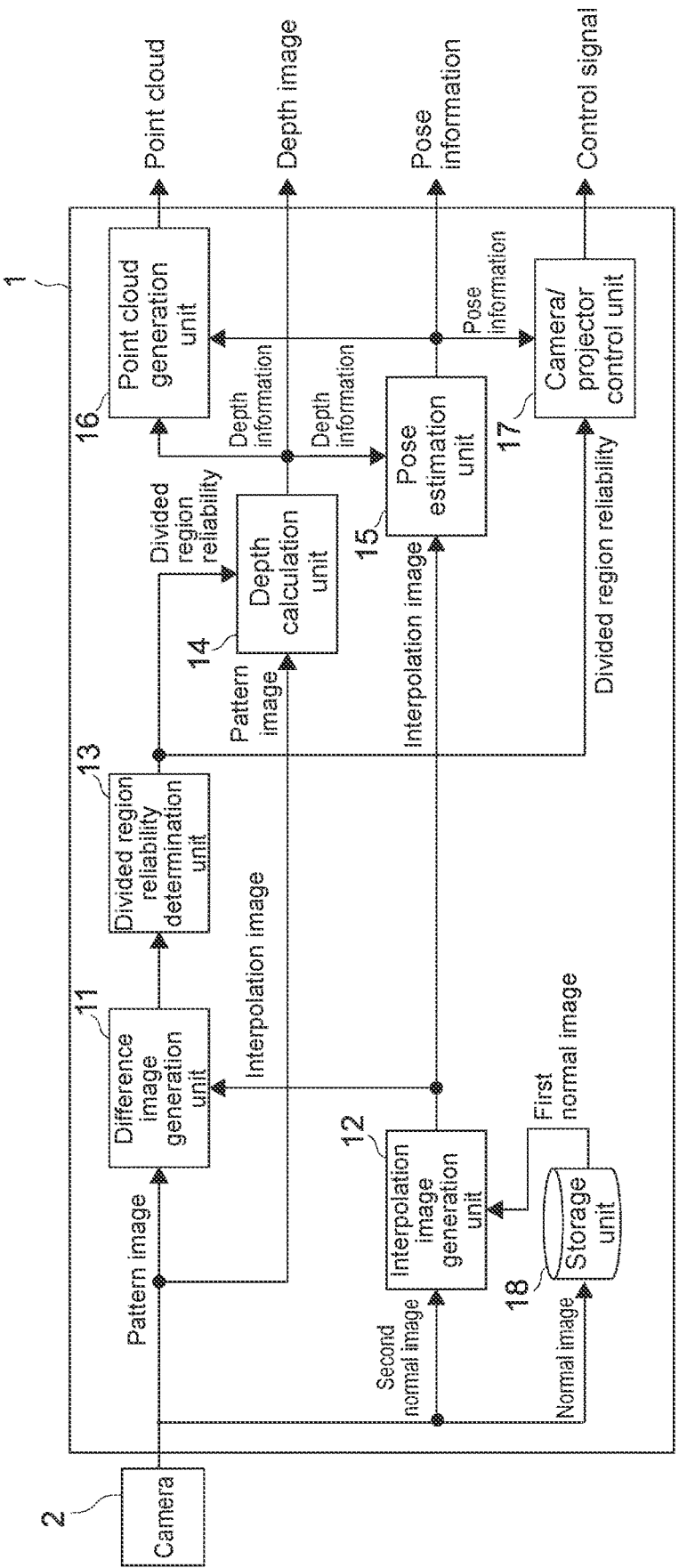
FIG. 4 is a block diagram showing a configuration of the information processing apparatus described above and is a diagram for describing a processing flow.

The information processing apparatus 1 will be described with reference to FIGS. 1 to 4. FIG. 3 is a diagram for describing a procedure of generating an interpolation image and a difference image by the information processing apparatus 1. FIG. 4 is a block diagram showing the configuration of the information processing apparatus 1.

As shown in FIGS. 1 and 4, the information processing apparatus 1 includes a difference image generation unit 11, an interpolation image generation unit 12, a divided region reliability determination unit 13, a depth calculation unit 14, a pose estimation unit 15, a point cloud generation unit 16, the camera/projector control unit 17, and a storage unit 18.

As shown in FIG. 2(A), in this embodiment, the camera 2 is controlled such that the shutter is continuously released three times during one frame. When the second shutter is released, the target object is irradiated with the infrared random pattern light 35.

Thus, as shown in FIG. 3, at the first shutter, a first normal image 41 is captured by the camera 2. At the second shutter, a pattern image 51 obtained by imaging the object irradiated with the infrared random pattern light 35 is captured by the camera 2. At the third shutter, a second normal image 42 is acquired.

(Storage Unit)

As shown in FIG. 4, the storage unit 18 stores the normal images acquired by the camera 2 in chronological order.

Further, the storage unit 18 stores a program for executing information processing related to the determination on reliability of the depth information of the pattern image 51.

The program stored in the storage unit 18 is for causing the information processing apparatus 1 to execute processing including the steps of: acquiring the first normal image 41 of the target object, the pattern image 51 irradiated with the infrared random pattern light 35, and the second normal image 42, which are sequentially captured; generating an interpolation image 52 corresponding to the time at which the pattern image 51 is captured on the basis of the first normal image 41 and the second normal image 42; generating a difference image 53 between the interpolation image 52 and the pattern image 51; and calculating the depth information of the target object using the difference image 53.

(Interpolation Image Generation Unit)

As shown in FIGS. 3 and 4, the interpolation image generation unit 12 acquires the second normal image 42 and the first normal image 41, which is acquired further earlier than the pattern image 51 acquired earlier than the second normal image 42, from the storage unit 18.

The interpolation image generation unit 12 generates the interpolation image 52 corresponding to the time at which the pattern image 51 is acquired, on the basis of the first normal image 41 and the second normal image 42.

A general technique can be applied to the generation of the interpolation image 52. For example, there are a method of generating an interpolation image 52 on the basis of a motion vector of an image, a method of generating an interpolation image 52 using a super-resolution filter on the basis of advance learning, a method of generating an interpolation image 52 using a luminance-based interpolation average filter, and the like.

The first normal image 41 (second normal image 42) includes two images, a right first normal image 41R (right second normal image 42R) and a left first normal image 41L (left second normal image 42L), which are captured by the camera 2 including the right camera and the left camera.

The interpolation image 52 includes a right interpolation image 52R generated on the basis of the right first normal image 41R and the right second normal image 42R, and a left interpolation image 52L generated on the basis of the left first normal image 41L and the left second normal image 42L. Note that only one of the interpolation image 52R and the interpolation image 52L may be used as the interpolation image 52.

(Difference Image Generation Unit)

As shown in FIGS. 3 and 4, the difference image generation unit 11 generates the difference image 53 obtained by a difference between the interpolation image 52 generated by the interpolation image generation unit 12 and the pattern image 51 acquired from the camera 2.

(Divided Region Reliability Determination Unit)

The divided region reliability determination unit 13 serving as a reliability determination unit analyzes the difference image 53 generated by the difference image generation unit 11 and determines the reliability of the depth information of the pattern image 51.

Specifically, the divided region reliability determination unit 13 evaluates whether the difference image is clear or not and bright or not using the luminance information of the image, for each of a plurality of divided regions obtained by dividing the difference image 53 into grids. Note that the size of about 8×8 images, for example, can be adopted for one divided region.

More specifically, an average luminance value, a dispersion value of the luminance, and a dynamic range are calculated as the luminance information for each divided region obtained by dividing the difference image 53 into grids. The dispersion value of the luminance and the dynamic range are used as indices of the variation in luminance and are used in the determination of the clearness.

The average luminance value is the average of the luminance values of all pixels in one divided region.

The dispersion value of the luminance is obtained by obtaining the difference between the luminance value of each image in one divided region and the average luminance value of that divided region to calculate the deviation in each pixel, and then calculating the root mean square of the deviation.

The dynamic range is obtained by the difference between a maximum luminance value and a minimum luminance value in one divided region.

In order to determine whether or not the difference image is clear for each divided region, the divided region reliability determination unit 13 evaluates whether or not the dispersion value or the dynamic range is equal to or larger than a threshold value. If the dispersion value or the dynamic range is larger than the threshold value, it is determined that the reliability of the depth information is high. If the dispersion value or the dynamic range is smaller than the threshold value, it is determined that the reliability of the depth information is low. Further, the reliability of the depth information is given in accordance with the magnitude of the dispersion value or the dynamic range.

If it is determined that all the divided regions are clear by the determination of the clearness, it is determined that the reliability of the depth information of the pattern image is high.

If it is determined that the reliability is high by the determination of the clearness, the processing of calculating the depth information for use in generation of a point cloud or a depth image, estimation of pose information for generating a point cloud, and the like is executed.

On the other hand, if it is determined that the reliability is low, the processing of calculating the depth information for use in generation of a point cloud or a depth image, estimation of pose information for generating a point cloud, and the like is not executed.

If it is determined that the reliability is low by the determination of the clearness, a control signal is generated to change the exposure time of the imaging element 23 of the camera 2 or the irradiation power of the infrared light source 32 of the projector 3 at the imaging in the next frame such that a pattern image of more reliable depth information is obtained at the imaging in the next frame.

Although the details will be described later with reference to FIG. 6, the movement speed of the camera 2 is used in the generation of the control signals for the camera 2 and the projector 3 at the imaging in the next frame for acquiring a more reliable pattern image.

The movement speed of the camera 2 is calculated on the basis of the pose information estimated by the pose estimation unit 15. Further, a calculation result of the depth information and the interpolation image 52 are used for the estimation of the pose information in the pose estimation unit 15. In this calculation of the depth information, the pattern image 51 whose reliability is determined to be low is used.

If it is determined that the difference image is not clear in the determination of the clearness, the divided region reliability determination unit 13 determines whether or not the difference image is bright for each divided region. The average luminance value is used for the determination on whether or not the difference image is bright, and it is evaluated whether or not the average luminance value is equal to or larger than a threshold value.

Using the determination result of the brightness and the movement speed of the camera 2 described above, a control signal is generated to change the exposure time of the imaging element 23 of the camera 2 or the irradiation power of the infrared light source 32 of the projector 3 at the imaging in the next frame such that a pattern image of more reliable depth information is obtained.

Note that in this embodiment, an example in which the dispersion value or the dynamic range is used in the determination of the clearness of the difference image has been described, but a spatial frequency may be used as the luminance information.

(Depth Calculation Unit)

As shown in FIG. 4, the depth calculation unit 14 calculates depth information using the pattern image 51. For example, the depth information can be calculated using a block matching technique.

The pattern image 51 includes two images of a right pattern image 51R and a left pattern image 51L captured by the camera 2 including the right camera and the left camera.

In the block matching technique, the right pattern image 51R and the left pattern image 51L are matched for each block.

Specifically, for example, when image matching is performed in units of 8×8 blocks, a block close to the blocks of the 8×8 images, in which the pixel of interest of the right pattern image 51R captured by the right camera is centered, is searched for from the left pattern image 51L to obtain parallax. That is, the depth calculation unit 14 performs image comparison between an 8×8 block of the right pattern image 51R and an 8×8 block of the left pattern image 51L for each horizontal pixel in the search range of the left pattern image 51L. For example, when the search range is 64 pixels, image matching of blocks is performed 64 times for each pixel of the right pattern image 51R, and this is performed for all the pixels of the right pattern image.

The right camera and the left camera constituting the camera 2 are fixed, and the distance between the cameras (baseline length) is fixed. Therefore, the depth is calculated on the basis of the parallax obtained by the block matching and the baseline length.

When the matching processing described above is performed for all the pixels, the depth information of each pixel is obtained, and a depth image of the entire screen can be generated.

The generated depth image is highly accurate because it is generated when the depth information is calculated using the pattern image 51 determined to have high reliability of the depth information by the divided region reliability determination unit 13.

(Pose Estimation Unit)

As shown in FIG. 4, the pose estimation unit 15 acquires the pose information of the camera 2 using the interpolation image 52 and the depth information. The pose estimation unit 15 estimates the position and pose of the camera 2 by tracking the pixels, for which the depth information is obtained, in different frames. The movement speed of the camera 2 is calculated using a result of the estimation.

(Point Cloud Generation Unit)

As shown in FIG. 4, the point cloud generation unit 16 generates a point cloud in a single reference coordinate system of the target object that is the subject, on the basis of the depth information calculated by the depth calculation unit 14 using the pattern image 51 having high reliability of the depth information and the pose estimation estimated by the pose estimation unit 15 using the depth information and the interpolation image 52.

(Camera/Projector Control Unit)

The camera/projector control unit 17 generates control signals for controlling the exposure time in the camera 2 and the irradiation power of the infrared random pattern light emitted from the projector 3 at the imaging in the next frame by using the pose information estimated by the pose estimation unit 15 on the basis of the determination results by the divided region reliability determination unit 13, in which the difference image is determined to be unclear by the determination of the clearness, and the reliability of the depth information is determined to be low.

As described above, the camera/projector control unit 17 is an exposure control unit and an irradiation control unit.

[Information Processing Method]

Figure 5:
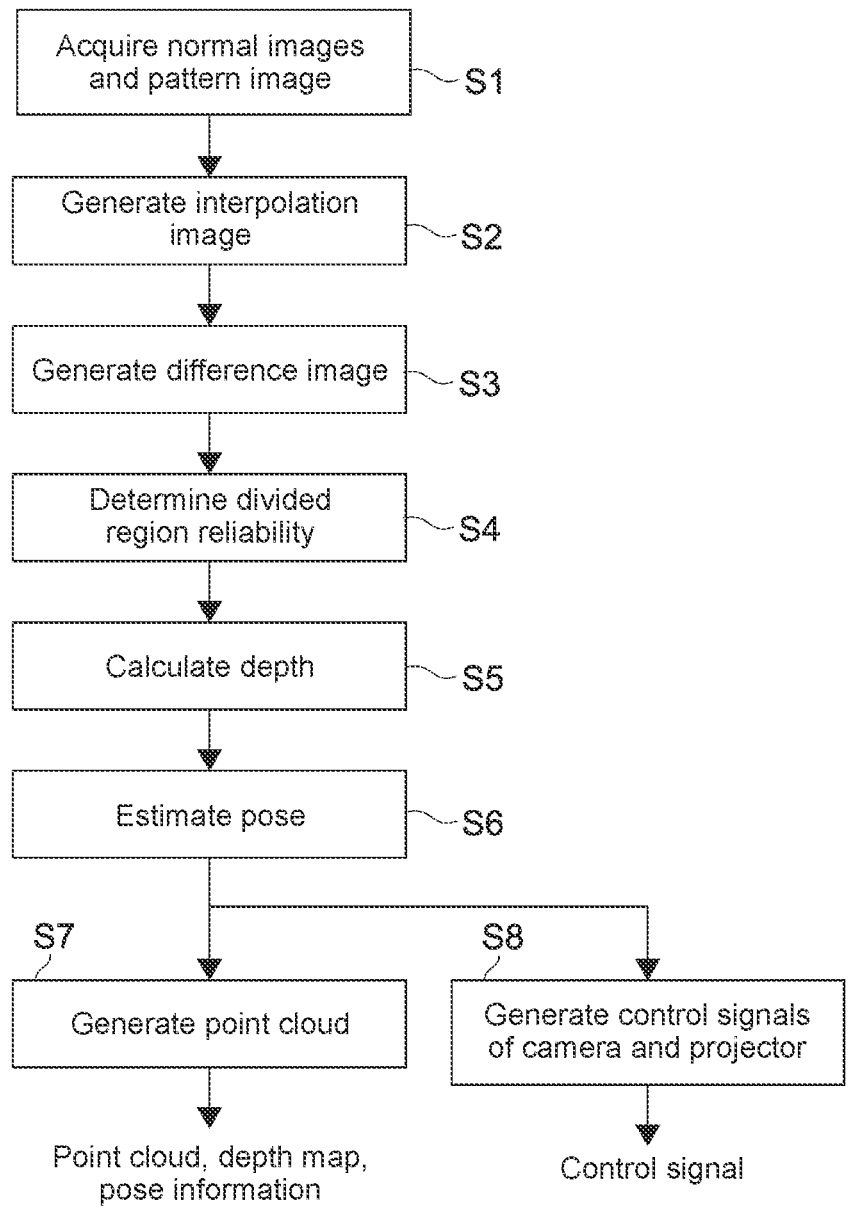
FIG. 5 is a flowchart for describing an information processing method by the information processing apparatus described above.

An information processing method for the information processing apparatus 1 described above will be described with reference to FIGS. 3 to 6 according to a flowchart of FIG. 5. FIG. 5 is a flowchart for describing an information processing method by the information processing apparatus 1. FIG. 6 is a flowchart for describing a method of determining the reliability of the depth information for each divided region by using the difference image by the divided region reliability determination unit 13, and a method of generating the control signal by the camera/projector control unit 17.

As shown in FIGS. 3 to 5, the information processing apparatus 1 acquires the first normal image 41, the pattern image 51, and the second normal image 42 of the target object, which are captured by the camera 2 in this order (S1).

Next, the interpolation image generation unit 12 generates the interpolation image 52 by using the first normal image 41 and the second normal image 42 (S2).

Next, the difference image generation unit 11 generates the difference image 53 by using the interpolation image 52 and the pattern image 51 (S3).

Next, the divided region reliability determination unit 13 calculates the average luminance value, the dispersion value, and the dynamic range as the luminance information for each divided region obtained by dividing the difference image 53 into grids, and determines the reliability of the depth information using those values (S4). Details of determining the reliability of the depth information will be described later.

Next, if the divided region reliability determination unit 13 determines that the reliability of the depth information is high, the depth calculation unit 14 calculates the depth information using the pattern image 51 (S5).

Next, the pose estimation unit 15 estimates the pose information of the camera 2 by using the interpolation image 52 and the depth information (S6). The movement speed of the camera 2 is estimated on the basis of the pose information.

Next, the point cloud generation unit 16 generates a point cloud as three-dimensional space information of the target object, on the basis of the depth information calculated by the depth calculation unit 14 by using the pattern image 51 determined to be highly reliable in the reliability determination of the depth information, and the pose information estimated by the pose estimation unit 15 by using the depth information and the interpolation image 52 (S7).

Here, the interpolation image 52 is an image corresponding to the time at which the pattern image 51 is captured, and the pattern image 51 used in the depth information calculation and the interpolation image 52 used in the pose estimation are regarded as images captured at the same time.

That is, in the point cloud generation, it is possible to use the depth information and the pose information with no time lag, and it is possible to generate a point cloud with higher accuracy.

Return to the flowchart shown in FIG. 5.

The camera/projector control unit 17 generates the control signals for the camera 2 and the projector 3 on the basis of the determination result by the divided region reliability determination unit 13 and the pose information estimated by the pose estimation unit 15 (S8). Details will be described later.

Next, an information processing method in the divided region reliability determination unit 13 and the camera/projector control unit 17 will be described with reference to FIG. 6. In FIG. 6, the steps S11 to S18 are performed for each frame.

Figure 6:
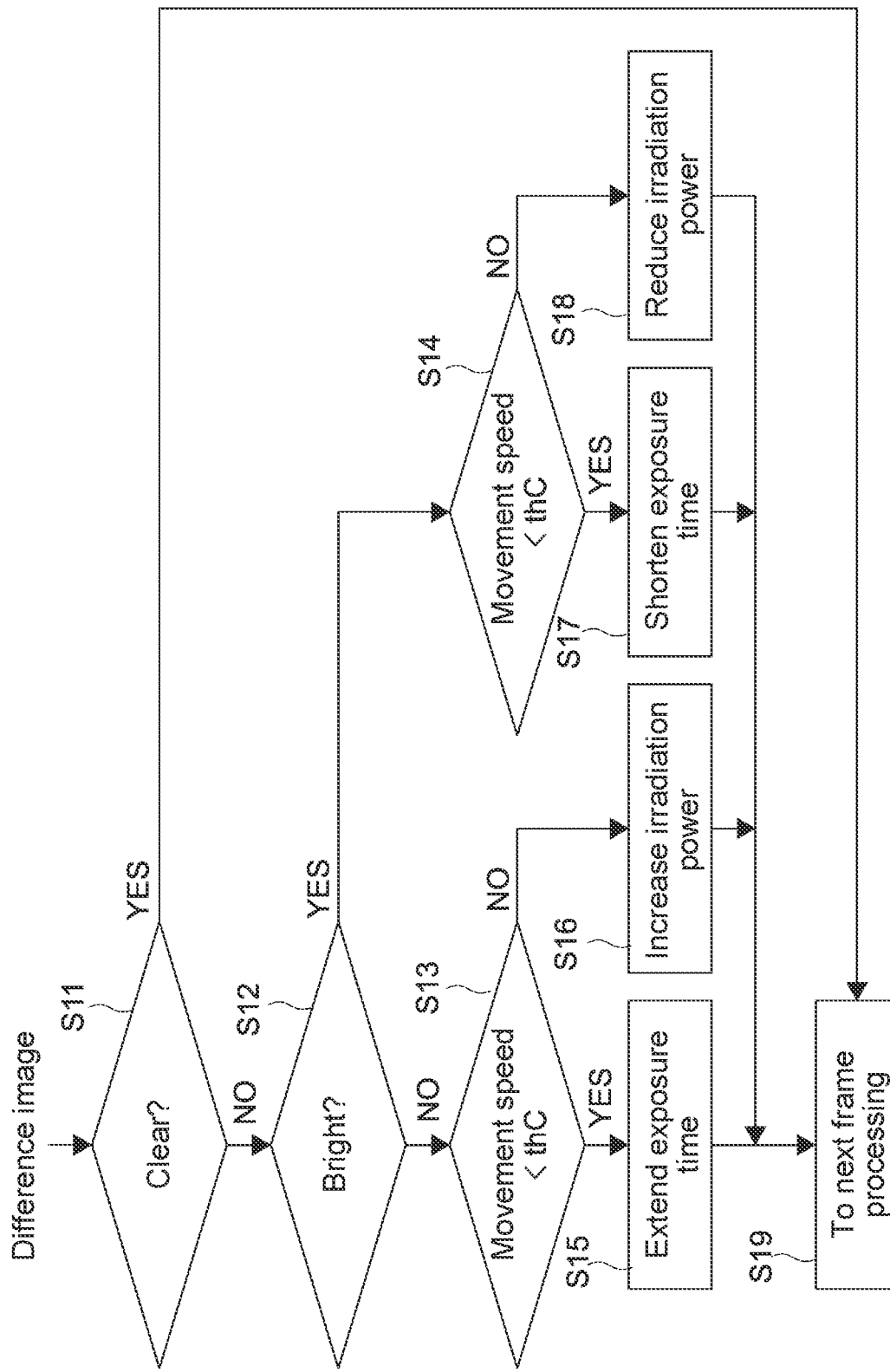
FIG. 6 is a flowchart for describing a method of generating a control signal in the camera/projector control unit by using a difference image.

In FIG. 6, the clearness determination processing for each divided region in S11 and the brightness determination processing in S12 are performed by the divided region reliability determination unit 13. The processing of S13 to S18 is performed by the camera/projector control unit 17.

As shown in FIG. 6, the divided region reliability determination unit 13 determines whether or not the difference image is clear for each divided region (S11). The dispersion value or the dynamic range is used for the determination of the clearness, and whether or not the dispersion value or the dynamic range is equal to or larger than a threshold value is evaluated.

If it is determined in S11 that the value is equal to or larger than the threshold value, the difference image is clear, and the reliability of the depth information is high (Yes), the processing proceeds to S19 and proceeds to processing in the next frame. Also in the processing in the next frame, the processing in S11 to S18 is performed.

The imaging in the next frame is performed by controlling the imaging time of the imaging element 23 of the camera 2 and the irradiation power of the infrared random pattern light from the projector 3 by using the same control signal as the pulse waveform output in the immediately preceding frame.

If it is determined in S11 that the difference image is clear and the reliability of the depth information is high, the irradiation of the infrared random pattern light may be controlled to be turned off at the imaging in the next frame, so that the power consumption can be reduced.

For example, in the case of imaging in 60 frames per second, the imaging does not necessarily have to be performed for all frames. If a pattern image with high reliability of the depth information has been acquired, infrared irradiation may be configured to be turned off at the imaging in the next frame such that a pattern image is not be acquired, so that the power consumption can be reduced.

Further, if it is determined in S11 that the difference image is clear and the reliability of the depth information is high (Yes), the depth calculation unit 14 calculates the depth information for use in generation of a point cloud or a depth image, estimation of pose information for generating a point cloud, and the like by using the pattern image 51 determined to be high in reliability.

If it is determined in S11 that the value is less than the threshold value, the difference image is not clear, and the reliability of the depth information is low (No), the processing proceeds to S12.

In S12, it is determined whether or not the difference image is bright for each divided region. The average luminance value is used to determine the brightness, and it is determined whether or not the average luminance value is equal to or larger than the threshold value.

If it is determined in S12 that the value is less than the threshold value and the difference image is dark (No), the processing proceeds to S13.

If it is determined in S12 that the value is equal to or larger than the threshold value and the difference image is bright (Yes), the processing proceeds to S14.

Here, for example, when the image is too dark because the environment in which the target object to be imaged is placed is dark, or the target object itself is dark, it is difficult to identify the target object.

On the other hand, when the image is too bright, blown-out highlights or the like occur, and it is difficult to identify the target object.

In S13, it is determined whether or not the movement speed of the camera 2 estimated by the pose estimation unit 15 is equal to or larger than a threshold value thC. If the movement speed of the camera 2 is less than the threshold value, the camera 2 is slowly moving, and if the movement speed is equal to or larger than the threshold value, the camera 2 is rapidly moving.

If it is determined in S13 that the movement speed of the camera 2 is less than the threshold value thC (Yes), the camera/projector control unit 17 generates a camera control pulse (control signal) of the camera 2 such that the exposure time in the camera 2 is extended (S15). Further, the camera/projector control unit 17 generates an infrared irradiation pulse (control signal) such that the infrared irradiation time in the projector 3 is extended in accordance with the change of the exposure time in the camera 2.

An image is then acquired on the basis of the generated control signals at the time of imaging in the next frame, and thus a pattern image 51 that is not too dark and has higher reliability of depth information can be obtained.

Here, it is conceivable to increase the power of the infrared rays to be irradiated when the image is dark, but increasing the power of the infrared rays increases power consumption. Thus, it is favorable to control the image by the exposure time when the movement of the camera 2 is slow, so that it is possible to suppress an increase in power consumption.

If it is determined in S13 that the movement speed of the camera 2 is equal to or larger than the threshold value thC (No), the camera/projector control unit 17 generates an infrared irradiation pulse of the projector 3 such that the infrared irradiation power in the projector 3 increases (S16).

Here, in the case where the image is dark and the movement of the camera 2 is fast, an image to be captured is blurred if the exposure time is extended. So, it is favorable to increase the infrared irradiation power. As a result, an image is acquired on the basis of the generated control signals at the imaging in the next frame, and thus a pattern image 51 that is not too dark and has higher reliability of depth information can be obtained.

In S14, it is determined whether or not the movement speed of the camera 2 estimated by the pose estimation unit 15 is equal to or larger than the threshold value thC. If the movement speed of the camera 2 is less than the threshold value, the camera 2 is slowly moving, and if the movement speed is equal to or larger than the threshold value, the camera 2 is rapidly moving.

If it is determined in S14 that the movement speed of the camera 2 is less than the threshold value thC (Yes), the camera/projector control unit 17 generates a camera control pulse (control signal) of the camera 2 such that the exposure time in the camera 2 is shortened (S17). Further, the camera/projector control unit 17 generates an infrared irradiation pulse (control signal) such that the infrared irradiation time in the projector 3 is shortened in accordance with the change of the exposure time in the camera 2.

As a result, an image is acquired on the basis of the generated control signals at the imaging in the next frame, and thus a pattern image 51 that is not too bright and has higher reliability of depth information can be obtained.

If it is determined in S14 that the movement speed of the camera 2 is equal to or larger than the threshold thC (No), the camera/projector control unit 17 generates an infrared irradiation pulse of the projector 3 such that the infrared irradiation power in the projector 3 is reduced (S18).

As a result, an image is acquired on the basis of the generated control signals at the imaging in the next frame, and thus a pattern image 51 that is not too bright and has higher reliability of depth information can be obtained.

After each step of S15 to S18, the processing proceeds to S19. At the imaging in the next frame, the camera 2 and the projector 3 are controlled on the basis of the control signal generated in each step of S15 to S18 to perform processing.

As described above, the calculation of the depth information by the depth calculation unit 14 is performed regardless of the result of the reliability determination by the divided region reliability determination unit 13, but the depth information calculated when the reliability is determined to be high is used for the generation of a depth image, the generation of a point cloud, and the estimation of pose information for the generation of the point cloud.

On the other hand, the depth information calculated when the reliability is determined to be low is used to generate the control signals for controlling the camera 2 and the projector 3 such that a pattern image having higher reliability of the depth information is obtained at the imaging in the next frame.

Further, the pose estimation by the pose estimation unit 15 is performed regardless of the result of the reliability determination by the divided region reliability determination unit 13, but the pose information estimated when the reliability is determined to be high is used for generating a point cloud.

On the other hand, the pose information estimated when the reliability is determined to be low is used to generate the control signals for controlling the camera 2 and the projector 3 such that a pattern image having higher reliability of the depth information is obtained at the imaging in the next frame.

As described above, in this embodiment, the reliability of the depth information of the pattern image is determined using the difference image. Since the depth information is calculated on the basis of the pattern image determined to have high reliability of the depth information in the reliability determination, the depth information with high accuracy of the target object can be acquired.

In addition, since the pose information is acquired using the interpolation image corresponding to the time at which the pattern image is captured, it is possible to acquire an image for self-position estimation (interpolation image) and an image for depth information calculation (pattern image), which are regarded as having no time lag. Further, the reliability of the depth information is determined using the luminance information of the difference image between the interpolation image and the pattern image, which are regarded as having no time lag. This makes it possible to acquire the depth information with high accuracy.

In addition, it is possible to generate a point cloud with high accuracy by using the depth information and the pose information with high accuracy.

Further, in this embodiment, since the luminance information of the difference image is used to control the exposure time in the camera 2 or the irradiation power of the infrared random pattern light (irradiation power of the infrared light source) from the projector 3 at the imaging in the next frame, it is possible to obtain a pattern image with higher reliability of the depth information. Thus, it is possible to calculate the depth information using a pattern image with high reliability of the depth information, and to acquire the depth information with high accuracy.

OTHER EMBODIMENTS

The embodiments of the present technology are not limited to the embodiment described above, and various modifications may be made without departing from the gist of the present technology.

For example, in the embodiment described above, as shown in FIG. 2(A), the camera 2 is controlled such that the shutter is released three times in one frame period, and the timing of the infrared irradiation of the projector 3 is controlled such that the infrared irradiation is performed when the second shutter is released.

In contrast, as shown in FIG. 2(B), the operation of the camera 2 and the projector 3 may be controlled such that the shutter is released twice in the first frame to acquire the first normal image and the pattern image, and the shutter is released once in the subsequent second frame to acquire the second normal image.

In this manner, at least one of the first normal image or the second normal image only needs to be acquired within the same frame period as the pattern image, and the first normal image, the pattern image, and the second normal image only need to be captured in sequence.

In addition, in the embodiment described above, the case where the stereo camera is used as the camera 2 has been described, but a monocular camera may be used. In the case of a monocular camera, matching is performed between a design of an infrared pattern obtained by irradiating a target object with infrared rays and imaging the target object and a design of a fixed pattern for each distance from the target object acquired in advance, and depth information of a target region or a target feature point in the pattern image can be calculated.

In addition, in the embodiment described above, the first normal image and the second normal image are acquired immediately before and immediately after the pattern image, respectively, and the first normal image, the pattern image, and the second image are temporally continuously acquired in sequence, but the present technology is not limited to this. The first normal image, the pattern image, and the second image do not need to be temporally continuously acquired in sequence.

The acquisition of the first normal image (the second normal image) and the acquisition of the pattern image may be temporally separated from each other. It suffices to acquire the first normal image before the acquisition of the pattern image and to acquire the second normal image after the acquisition of the pattern image at least in terms of time.

Typically, as in the embodiment described above, the first normal image and the second normal image are acquired immediately before and immediately after the pattern image, respectively. As a result, an interpolation image with high accuracy can be obtained.

Figure 7:
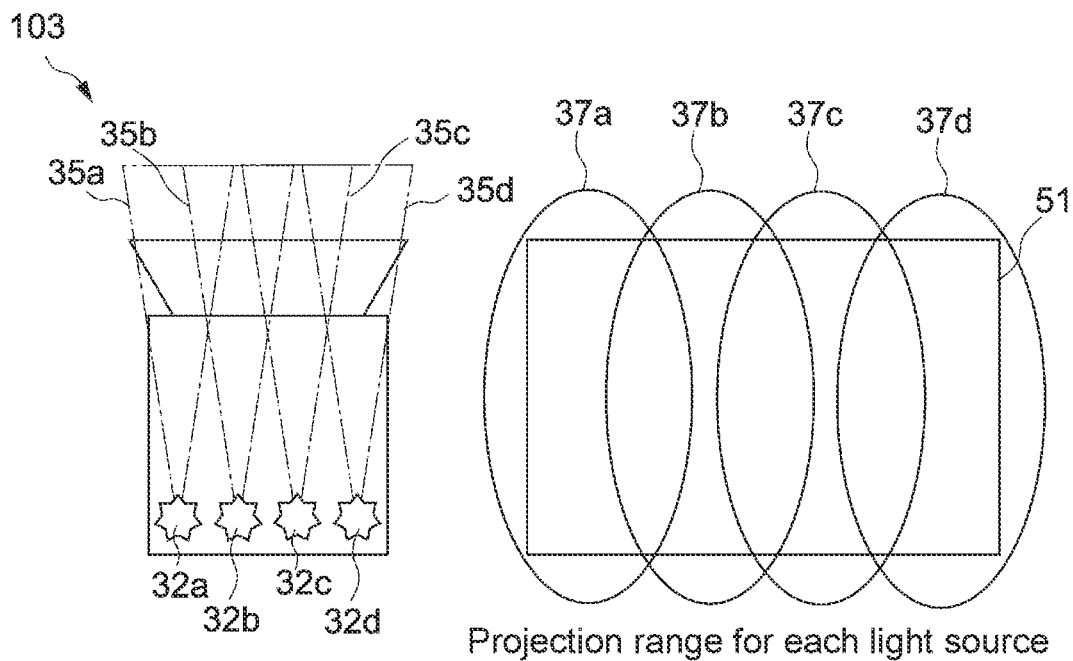
FIG. 7 is a schematic diagram of a projector mounting a plurality of infrared light sources and is a diagram for describing the irradiation region of infrared random pattern light for each infrared light source in a pattern image.

In addition, in the embodiment described above, the case where one infrared light source 32 is mounted on the projector 3 has been described as an example, but the projector may include a plurality of infrared light sources as shown in FIG. 7.

FIG. 7 is a schematic diagram of a projector 103 including a plurality of infrared light sources and is a diagram for describing the irradiation region of the infrared random pattern light 35 for each infrared light source 32 in the pattern image 51.

As shown in FIG. 7, the projector 103 includes four infrared light sources 32a to 32d. The projector 103 emits infrared random pattern light 35a to 35c generated when the infrared rays emitted from the respective infrared light sources 32a to 32d pass through the random pattern mask 33 (see FIG. 1).

Note that the number of infrared light sources is not limited to one or four, but a single infrared light source or a plurality of infrared light sources may be used.

The infrared light sources 32a to 32d are referred to as infrared light source 32 unless otherwise particularly distinguished. The same applies to the infrared random pattern light 35a to 35d and irradiation regions 37a to 37d, which will be described later. The infrared random pattern light 35a to 35d and the irradiation regions 37a to 37d are referred to as infrared random pattern light 35 and the irradiation region 37, respectively, unless otherwise particularly distinguished. The same applies to FIGS. 8 and 9 below.

The infrared random pattern light 35a to 35d generated by the infrared rays emitted from the respective infrared light sources 32a to 32d are emitted from the projector 103. When a state where a target object is irradiated with the emitted infrared random pattern light 35a to 35d is imaged, a pattern image 51 is acquired.

The pattern image 51 includes the irradiation regions 37a to 37d irradiated with the infrared random pattern light 35a to 35d generated from the respective infrared light sources 32a to 32d. The irradiation regions 37a to 37d are displaced along one direction, and adjacent irradiation regions partially overlap each other.

In such a manner, the projector 103 including the plurality of infrared light sources 32 may be used to set the pattern light irradiation regions in the pattern image 51 in accordance with the arrangement of the infrared light sources 32. Further, turn-on and turn-off of the irradiation of the plurality of infrared light sources 32 may be individually controllable.

Also in the case of using the projector including the plurality of infrared light sources, as described above, the difference image is generated on the basis of the pattern image acquired using the projector 103. Then, the reliability determination of the depth information is performed for each of the plurality of divided regions obtained by dividing the difference image into grids.

As a result of the reliability determination, when it is determined that the reliability of the depth information is high in all the divided region in the irradiation region 37 of a certain infrared light source 32, the infrared irradiation from the infrared light source 32 may be configured such that the irradiation is turned off and is not performed at the time of imaging in the next frame. This will be described below with reference to FIG. 8.

Figure 8:
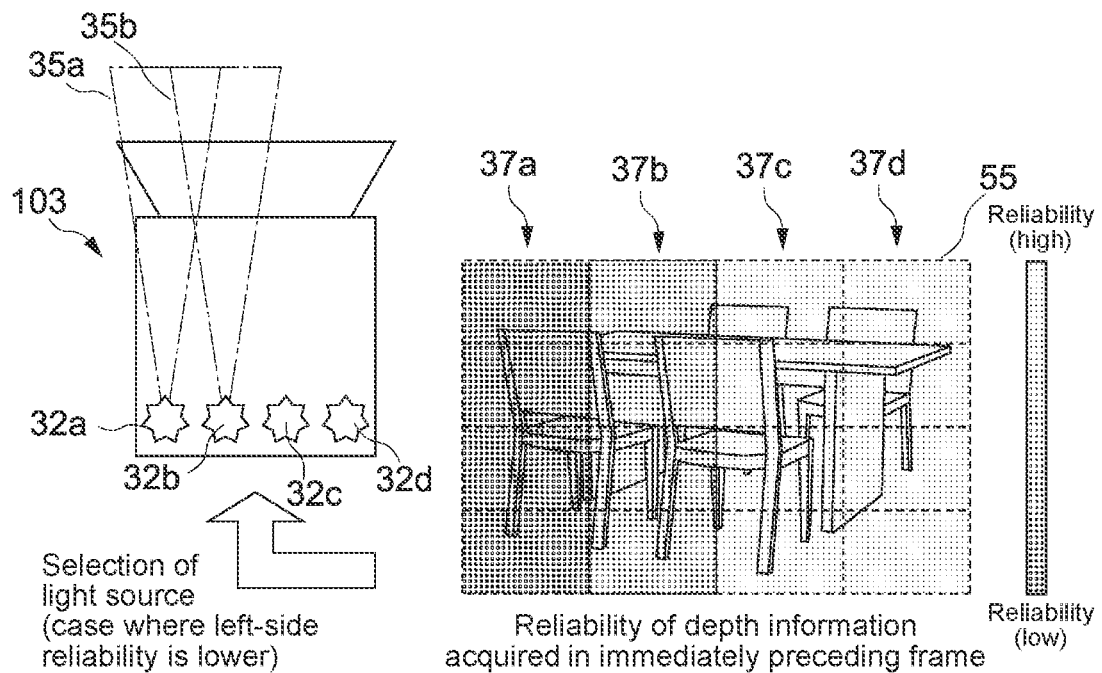
FIG. 8 is a diagram for describing the selection of an infrared light source of the projector.
Figure 9:
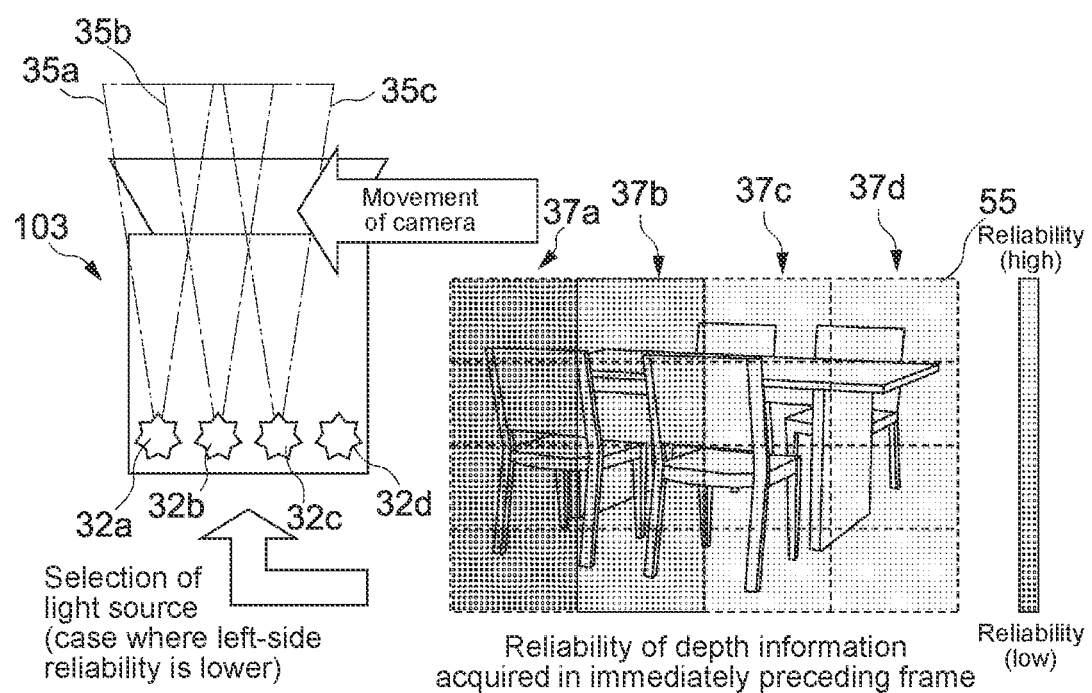
FIG. 9 is a diagram for describing the selection of an infrared light source of the projector.

Similarly to FIG. 7, FIG. 8 and FIG. 9 to be described later are schematic diagrams of the projector 103 including the four infrared light sources 32a to 32d and are diagrams for describing the irradiation region 37 of the infrared random pattern light 35 for each infrared light source 32 in the pattern image 51. Further, FIGS. 8 and 9 are diagrams for describing how to select the infrared light source to turn on the infrared irradiation at the imaging in the next frame on the basis of the result of the reliability determination. The configurations similar to those described above are denoted by similar reference symbols.

In FIG. 8 and FIG. 9 to be described later, a pattern image 55, which is obtained by imaging the target object irradiated with the infrared random pattern light 35a to 35d generated by using the infrared rays emitted from the infrared light sources 32a to 32d of the projector 103, includes irradiation regions 37a to 37d of the infrared random pattern light.

For convenience, FIGS. 8 and 9 show that the irradiation regions 37a to 37d each have a rectangular shape having a longitudinal direction in the vertical direction in the figure and that the adjacent irradiation regions do not overlap with each other.

A difference image is generated on the basis of the irradiated pattern image 55. The difference image is divided into grids, and the reliability determination of the depth information is performed for each of a plurality of divided regions using the luminance information.

FIG. 8 shows the pattern image 55 in which a result of the reliability determination is reflected. In the figure, a dot pattern in which the reliability is expressed by the density of dots is superimposed on the pattern image 55. The lower density of the dots indicates higher reliability of the depth information, and the higher density of the dots indicates lower reliability of the depth information.

The pattern image 55 shown in FIG. 8 indicates that the reliability of the depth information is high in the irradiation regions 37c and 37d, and the reliability of the depth information is low in the irradiation regions 37a and 37b. Here, it is assumed that the camera 2 is not moving.

As described above, the infrared light sources 32c and 32d corresponding to the irradiation regions 37c and 37d in which the reliability of the depth information is high are controlled such that the irradiation is turned off at the time of imaging in the next frame. Thus, power consumption can be reduced.

On the other hand, the infrared light sources 32a and 32b corresponding to the irradiation regions 37a and 37b in which the reliability of the depth information is low are controlled such that the irradiation is turned on at the time of imaging in the next frame.

Further, using the difference image when the reliability of the depth information is determined to be low, the control signals for the exposure time in the camera 2 and the irradiation power of the infrared light sources 32a and 32b of the projector 103 are generated as described above, and at the imaging in the next frame, the camera 2 and the projector 3 are controlled on the basis of the control signals to perform imaging.

In this manner, using the plurality of infrared light sources, it is possible to determine a region, which has highly reliable depth information and is effective for the generation of a point cloud or the like, in the pattern image. Further, the infrared light source can be selected such that infrared irradiation in a region in which the depth information is highly reliable and is effective is turned off at the time of imaging in the next frame, so that power consumption can be reduced.

Further, in consideration of the movement of the camera 2, it may be configured such that the infrared light source 32 to be turned on at the time of imaging in the next frame is selected. This will be described below with reference to FIG. 9.

As described above, a difference image is generated on the basis of the pattern image 55 irradiated with infrared rays emitted from the projector 103. The difference image is subjected to the reliability determination of the depth information for each of a plurality of divided regions divided into grids by using the luminance information. In FIG. 9, similarly to FIG. 8, a dot pattern representing the reliability is superimposed on the pattern image 55, in which a result of the reliability determination is reflected.

In the pattern image 55 shown in FIG. 9, the reliability of the depth information is high in the irradiation regions 37c and 37d, and the reliability of the depth information is low in the irradiation regions 37a and 37b. Here, it is assumed that the camera 2 moves from right to left in the figure.

In the pattern image 55 of FIG. 9, when it is assumed that the camera 2 moves from right to left, the infrared light sources 32a to 32c for emitting the infrared random pattern light are selected such that a pattern image of a region having low reliability in the pattern image captured in the frame just before the camera 2 moves is acquired again at the time of imaging in the next frame.

As described above, when the projector includes the plurality of infrared light sources, the irradiation regions of the infrared light are set in accordance with the arrangement of the infrared light sources. Then, it may be configured such that an infrared light source to perform the infrared irradiation is selected, i.e., the irradiation region of the infrared random pattern light is set, on the basis of the result of the reliability determination of the depth information for each irradiation region irradiated with the infrared random pattern light from each infrared light source at the time of imaging in the next frame.

Further, it may be configured such that the irradiation region is selected by controlling the mirror and the lens mounted on the projector to concentrate the light, in addition to the configuration in which the plurality of infrared light sources described above is mounted on the projector, as a method of setting the irradiation region of the infrared random pattern light in accordance with the result of the reliability determination of the depth information.

Note that the present technology may take the following configurations.

(1) An information processing apparatus, including:

an interpolation image generation unit that generates an interpolation image on the basis of a first normal image and a second normal image among the first normal image, a pattern image irradiated with infrared pattern light, and the second normal image, the interpolation image corresponding to a time at which the pattern image is captured;

a difference image generation unit that generates a difference image between the interpolation image and the pattern image; and a depth calculation unit that calculates depth information by using the difference image.

(2) The information processing apparatus according to (1), in which the depth calculation unit calculates the depth information from the pattern image on the basis of a result of determining reliability of the depth information in the pattern image, the depth information being determined by using the difference image.

(3) The information processing apparatus according to (1) or (2), further including a reliability determination unit that determines the reliability of the depth information in the pattern image by using luminance information for each of divided regions obtained by dividing the difference image into grids.

(4) The information processing apparatus according to (3), in which the luminance information is a dispersion value of luminance for each of the divided regions.

(5) The information processing apparatus according to (3), in which the luminance information is a dynamic range of luminance for each of the divided regions.

(6) The information processing apparatus according to (3), in which
the luminance information is a spatial frequency for each of the divided regions.

(7) The information processing apparatus according to any one of (3) to (6), in which
an irradiation region of the infrared pattern light in a pattern image at imaging for a next pattern image is set in accordance with a result of the determination by the reliability determination unit.

(8) The information processing apparatus according to (7), in which
the infrared pattern light is emitted from a pattern irradiation unit including a plurality of infrared light sources, and
the pattern image is captured when the infrared pattern light having irradiation regions different for each of the plurality of infrared light sources is emitted.

(9) The information processing apparatus according to any one of (1) to (8), in which
the first normal image, the pattern image, and the second normal image are captured by a camera including an imaging element, and
the information processing apparatus further includes an exposure control unit that controls an exposure time of the imaging element by using the luminance information for each of the divided regions obtained by dividing the difference image into grids.

(10) The information processing apparatus according to any one of (1) to (9), further including
an irradiation control unit that controls irradiation power of the infrared pattern light by using the luminance information for each of the divided regions obtained by dividing the difference image into grids.

(11) The information processing apparatus according to any one of (1) to (10), in which
the interpolation image generation unit generates the interpolation image on the basis of the first normal image captured immediately before the pattern image is captured, and the second normal image captured immediately after the pattern image is captured.

(12) The information processing apparatus according to any one of (1) to (11), in which
at least one of the first normal image or the second normal image is acquired within a same frame period as the pattern image.

(13) An information processing method, including:
acquiring a first normal image, a pattern image irradiated with infrared pattern light, and a second normal image;
generating an interpolation image on the basis of the first normal image and the second normal image, the interpolation image corresponding to a time at which the pattern image is captured;
generating a difference image between the interpolation image and the pattern image; and
calculating depth information by using the difference image.

(14) A program for causing an information processing apparatus to execute processing including the steps of:
acquiring a first normal image, a pattern image irradiated with infrared pattern light, and a second normal image;
generating an interpolation image on the basis of the first normal image and the second normal image, the interpolation image corresponding to a time at which the pattern image is captured;
generating a difference image between the interpolation image and the pattern image; and
calculating depth information by using the difference image.

REFERENCE SIGNS LIST 1 information processing apparatus
2 camera
3 projector (pattern irradiation unit)
11 difference image generation unit
12 interpolation image generation unit
13 divided region reliability determination unit (reliability determination unit)
14 depth calculation unit
23 imaging element
32, 32a to 32d infrared light source
35 infrared random pattern light (infrared pattern light)
37a to 37d irradiation region
41 first normal image
42 second normal image
51 pattern image
52 interpolation image
53 difference image

The invention claimed is:
1. An information processing apparatus, comprising:
an interpolation image generation unit that generates an interpolation image on a basis of a first normal image and a second normal image among the first normal image, a pattern image irradiated with infrared pattern light, and the second normal image, the interpolation image corresponding to a time at which the pattern image is captured;
a difference image generation unit that generates a difference image between the interpolation image and the pattern image; and
a depth calculation unit that calculates depth information by using the difference image.

2. The information processing apparatus according to claim 1, wherein
the depth calculation unit calculates the depth information from the pattern image on a basis of a result of determining reliability of the depth information in the pattern image, the depth information being determined by using the difference image.

3. The information processing apparatus according to claim 2, further comprising
a reliability determination unit that determines the reliability of the depth information in the pattern image by using luminance information for each of divided regions obtained by dividing the difference image into grids.

4. The information processing apparatus according to claim 3, wherein
the luminance information is a dispersion value of luminance for each of the divided regions.

5. The information processing apparatus according to claim 3, wherein
the luminance information is a dynamic range of luminance for each of the divided regions.

6. The information processing apparatus according to claim 3, wherein
the luminance information is a spatial frequency for each of the divided regions.

7. The information processing apparatus according to claim 3, wherein
an irradiation region of the infrared pattern light in a pattern image at imaging for a next pattern image is set in accordance with a result of the determination by the reliability determination unit.

8. The information processing apparatus according to claim 7, wherein
the infrared pattern light is emitted from a pattern irradiation unit including a plurality of infrared light sources, and
the pattern image is captured when the infrared pattern light having irradiation regions different for each of the plurality of infrared light sources is emitted.

9. The information processing apparatus according to claim 3, wherein
the first normal image, the pattern image, and the second normal image are captured by a camera including an imaging element, and
the information processing apparatus further comprises an exposure control unit that controls an exposure time of the imaging element by using the luminance information for each of the divided regions obtained by dividing the difference image into grids.

10. The information processing apparatus according to claim 9, further comprising
an irradiation control unit that controls irradiation power of the infrared pattern light by using the luminance information for each of the divided regions obtained by dividing the difference image into grids.

11. The information processing apparatus according to claim 10, wherein
the interpolation image generation unit generates the interpolation image on a basis of the first normal image captured immediately before the pattern image is captured, and the second normal image captured immediately after the pattern image is captured.

12. The information processing apparatus according to claim 11, wherein
at least one of the first normal image or the second normal image is acquired within a same frame period as the pattern image.

13. An information processing method, comprising:
acquiring a first normal image, a pattern image irradiated with infrared pattern light, and a second normal image;
generating an interpolation image on a basis of the first normal image and the second normal image, the interpolation image corresponding to a time at which the pattern image is captured;
generating a difference image between the interpolation image and the pattern image; and
calculating depth information by using the difference image.

14. A non-transitory computer-readable medium having embodied thereon a program, which when executed by a processor of an information processing apparatus causes the information processing apparatus to execute an information processing method, the method comprising:
acquiring a first normal image, a pattern image irradiated with infrared pattern light, and a second normal image;
generating an interpolation image on a basis of the first normal image and the second normal image, the interpolation image corresponding to a time at which the pattern image is captured;
generating a difference image between the interpolation image and the pattern image; and
calculating depth information by using the difference image.

* * * * *